May 24, 1966     A. A. TENNISON, JR     3,252,289
LEAK-LOCK MULTI-COUPLER GUTTER JOINT
Filed March 1, 1962     4 Sheets-Sheet 1
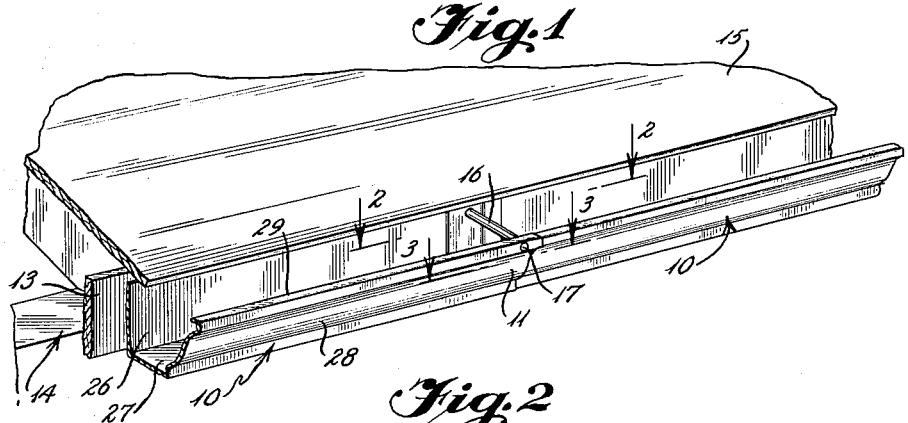
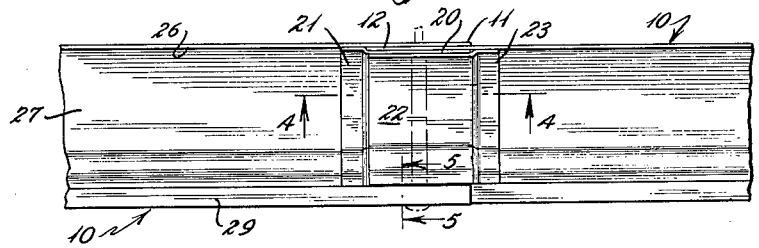
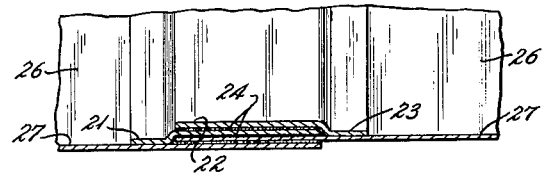
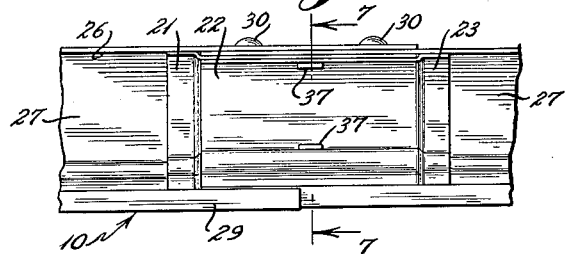
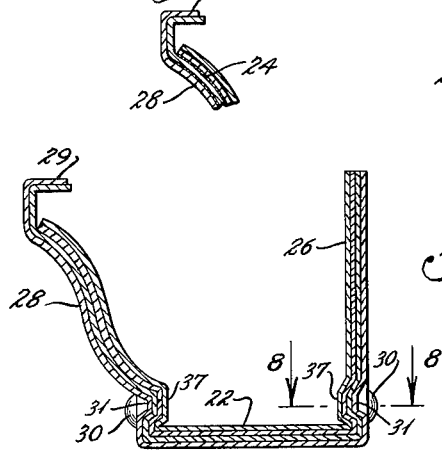
INVENTOR
Alfred A. Tennison, Jr.
BY
ATTORNEY

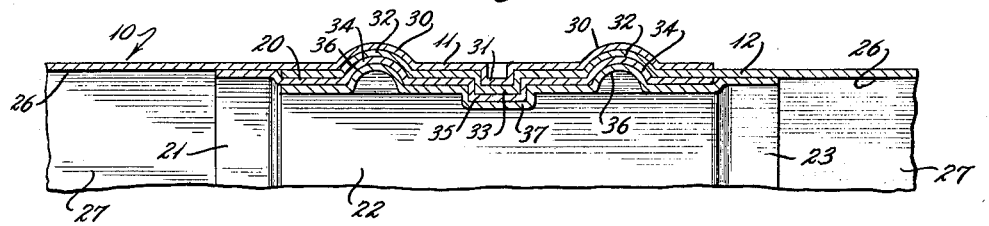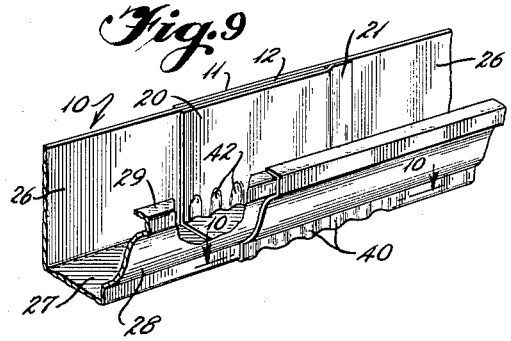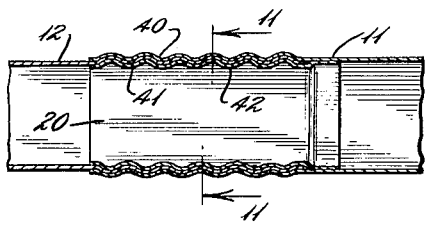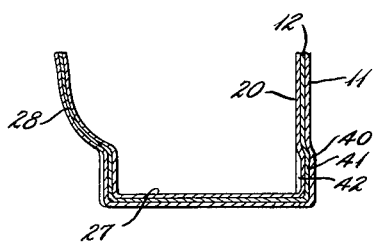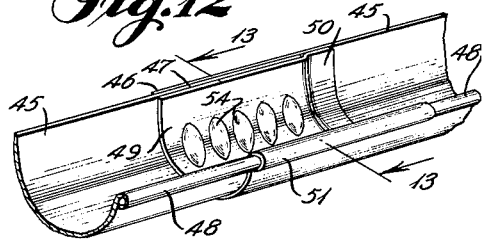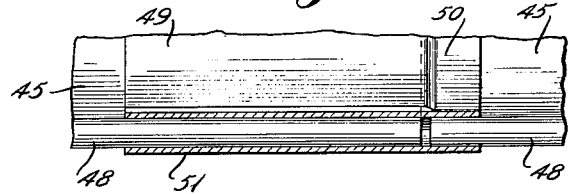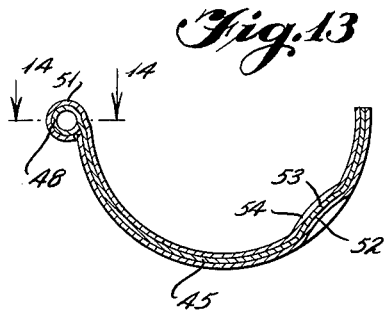

May 24, 1966     A. A. TENNISON, JR     3,252,289
LEAK-LOCK MULTI-COUPLER GUTTER JOINT
Filed March 1, 1962     4 Sheets-Sheet 3
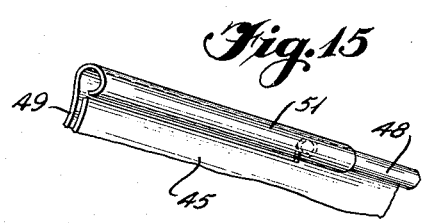
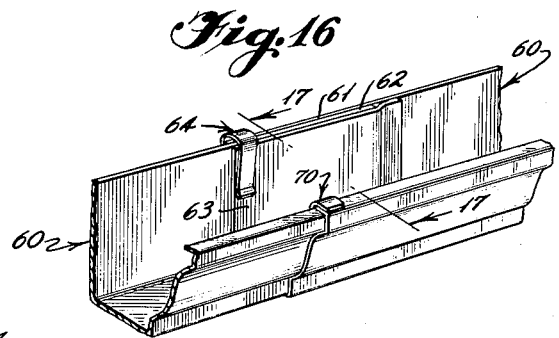
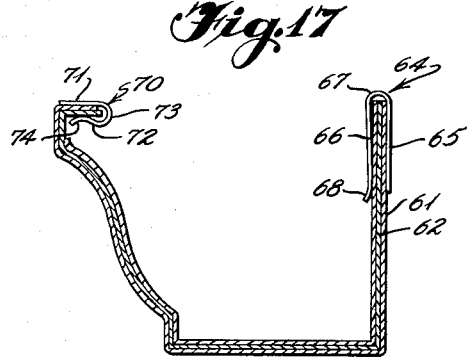
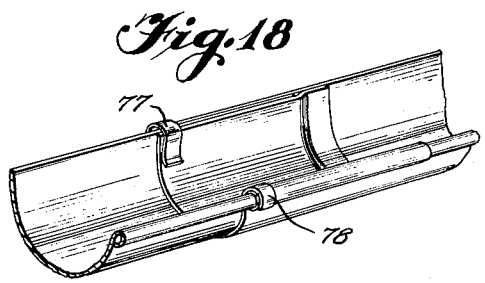
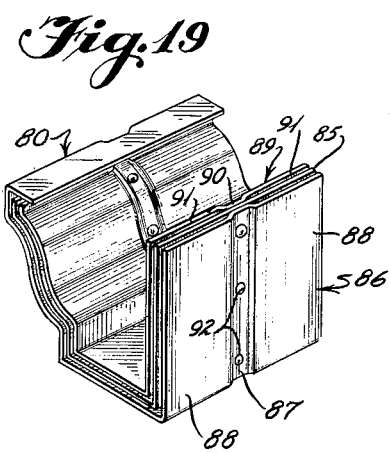
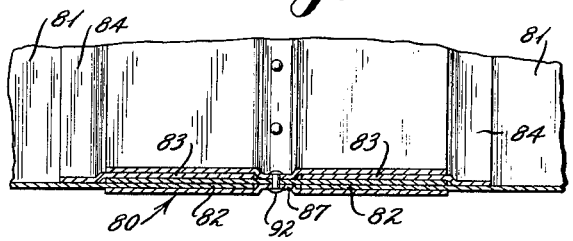
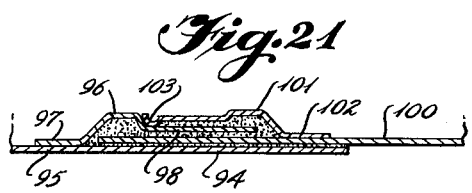
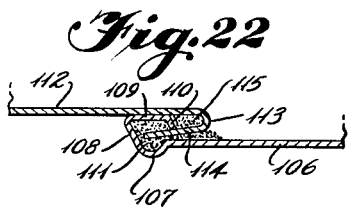
INVENTOR
Alfred A. Tennison, Jr.
BY
ATTORNEY May 24, 1966     A. A. TENNISON, JR     3,252,289
LEAK-LOCK MULTI-COUPLER GUTTER JOINT
Filed March 1, 1962     4 Sheets-Sheet 4
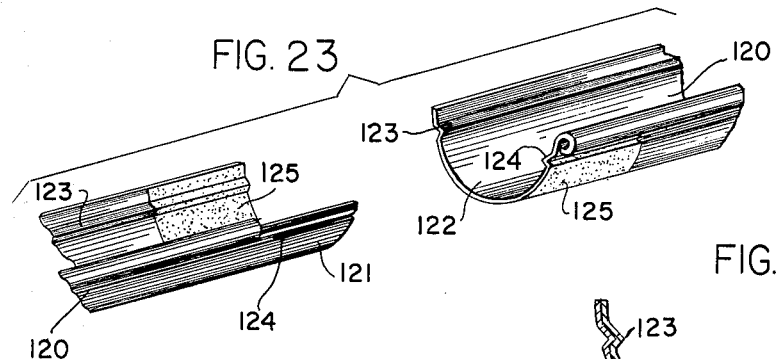
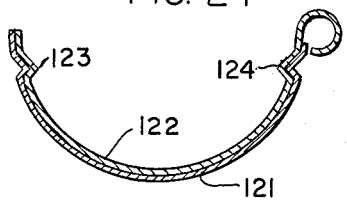
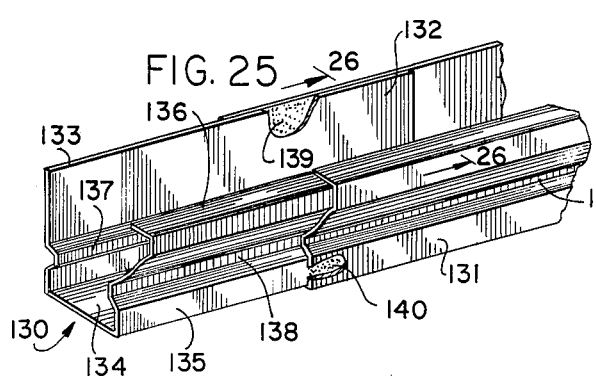
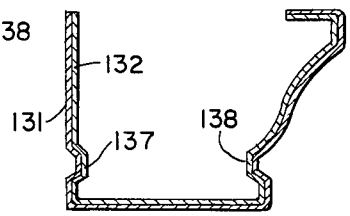
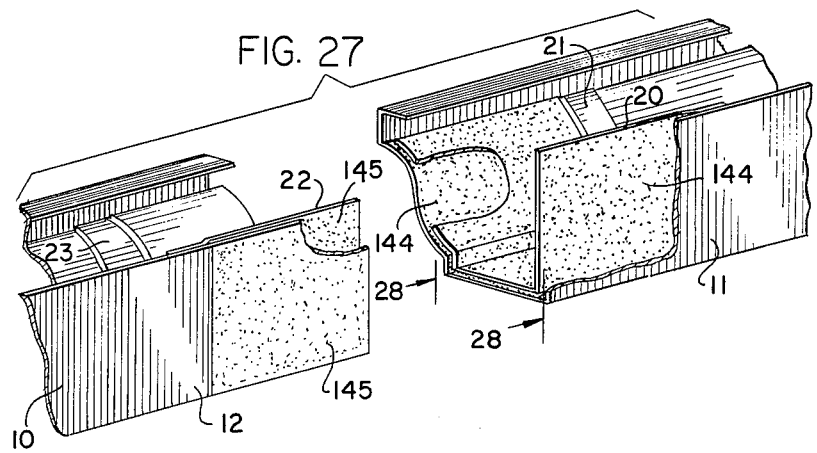
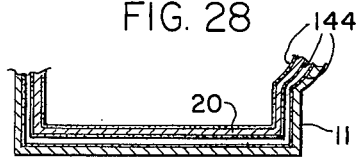
INVENTOR
ALFRED A. TENNISON, JR
BY
ATTORNEY United States Patent Office 3,252,289
Patented May 24, 1966

3,252,289
LEAK-LOCK MULTI-COUPLER GUTTER JOINT
Alfred A. Tennison, Jr., P.O. Box 7, Texarkana, Ark.
Filed Mar. 1, 1962, Ser. No. 176,755
3 Claims. (Cl. 61—15)

This invention relates to structures associated with buildings and to apparatus utilized for the protection of such buildings from natural elements.

This invention relates particularly to the protection of the exterior of buildings including gutters which discharge water and other fluids through the drainage system of the building, and to maintaining the water-tight integrity of the joints of such gutters.

Heretofore gutters of various kinds, configurations and materials have been produced in standard lengths and included joints of various kinds, some of which were overlapping and depended upon metal having a low melting point such as lead or solder which depended upon heat to create a water-tight bond between adjacent lengths of gutter.

It is an object of the invention to provide a coupling between adjacent lengths of gutter which will maintain the water-tight integrity of the gutter by the application of a waterproof metallic or non-metallic sealant to the ends of the gutter at the manufacturing plant.

Another object of the invention is to provide an improved gutter which is relatively simple in construction and which may be easily connected to adjoining lengths of gutter in such a manner that the connection will be water-tight.

A further object of the invention is to provide a coupling unit for connecting a pair of adjacent lengths of gutter.

A still further object of the invention is to provide means for locking together adjacent lengths of gutter in such a manner that the adjacent lengths cannot accidentally become disengaged or spread apart while in use.

Other objects and advantages of the invention will be apparent from the following description taken in conjunction with the accompanying drawings in which:

FIG. 1 is a fragmentary perspective illustrating one application of the invention;

FIG. 2, an enlarged fragmentary top plan view of the gutter joint of FIG. 1;

FIG. 3, an enlarged fragmentary section on the line 3—3 of FIG. 1;

FIG. 4, an enlarged fragmentary section on the line 4—4 of FIG. 2;

FIG. 5, an enlarged fragmentary section on the line 5—5 of FIG. 2.

FIG. 6, a fragmentary top plan view of a modified form of the invention;

FIG. 7, an enlarged section on the line 7-7 of FIG. 6;

FIG. 8, an enlarged fragmentary section on the line 8—8 of FIG. 7;

FIG. 9, a fragmentary perspective of another modification of the invention;

FIG. 10, a section on the line 10—10 of FIG. 9;

FIG. 11, an enlarged fragmentary section on the line 11—11 of FIG. 10;

FIG. 12, a fragmentary perspective of a further modified form of the invention;

FIG. 13, an enlarged section on the line 13—13 of FIG. 12;

FIG. 14, a fragmentary section on the line 14—14 of FIG. 13;

FIG. 15, a bottom perspective of the locking joint of FIG. 12;

FIG. 16, a fragmentary perspective of a still further modified form of the invention;

FIG. 17, an enlarged section on the line 17—17 of FIG. 16;

FIG. 18, a perspective similar to FIG. 16 illustrating a gutter of different configuration;

FIG. 19, a perspective of a gutter coupling joint;

FIG. 20, an enlarged fragmentary horizontal section illustrating the use of the coupling of FIG. 19;

FIGS. 21 and 22, enlarged fragmentary detail sections of locking means for connecting adjacent lengths of gutters;

FIG. 23, a perspective of a still further modified form of the invention;

FIG. 24, an enlarged vertical section taken through the joint of a pair of assembled gutters according to the modification of FIG. 23;

FIG. 25, a perspective of a still further modified form of the invention;

FIG. 26, an enlarged vertical section along the line 26—26 of FIG. 25;

FIG. 27, an exploded perspective of a still further modified form of the invention; and FIG. 28, an enlarged section on the line 28—28 of FIG. 27.

Briefly stated, the present invention comprises a length of gutter having male and female ends and means for connecting a pair of adjoining lengths of gutters in a manner to prevent leakage through the connecting joint and means for locking such lengths of gutters so that they cannot separate during the application or use thereof. This is accomplished by providing at least one end of each length of gutter with a reservoir adapted to contain a waterproof sealant and inserting the cooperating end of an adjacent length of gutter into the reservoir. If desired, both ends of the gutter may have a sealant reservoir adapted to receive the interfitting ends of adjacent lengths of gutter.

With continued reference to the drawings, the present invention comprises a length of gutter 10, having a female end 11 and a male end 12. The length of gutter is adapted to be assembled with or connected to an adjoining length of gutter or to an end cap and the completed unit then applied to a facia or eave board 13 on a building 14 immediately below the roof 15 thereof. The assembled unit is provided with sleeves or spacers 16 through which nails or other fasteners 17 extend, and such nails are driven through the front and rear surfaces of the gutter and into the facia board to removably attach the gutter unit to the building.

In order to provide a water-tight connection between the female end 11 of one length of gutter and the male end 12 of the next adjacent length of gutter, the female end 11 has an offset member 20 with a flange 21 on one end permanently attached to the female end 11 by soldering, welding or the like. The member 20 is offset inwardly from the gutter 10 a distance slightly greater than the thickness of the material of the male end of the cooperating gutter and such male end is adapted to be received between the female end 11 and the offset member 20.

The male end 12 also may have an offset member 22 with an offset flange 23 at one end for permanently attaching the offset member 22 to the male end of the gutter. The member 22 is offset from the male end 12 a distance slightly greater than the thickness of the offset portion 20 and is adapted to receive such offset portion between the male end 12 and the offset member 22. The offset members 20 and 22 in cooperation with the female and male ends 11 and 12 form pockets or reservoirs for the reception of a sealant 23 such as non-hardening waterproof mastic or other metallic or non-metallic sealant which is insoluble in water, and when the unit is assembled such sealant will not permit water to be received or trapped within the joint.

As illustrated in FIGS. 1 through 11, the lengths of gutter have an upright rear wall 26, a substantially horizontal bottom 27, an outwardly inclined corrugated outer wall 28 and an inturned flange 29. The offset portions 20 and 22 correspond substantially to the configuration of gutters 10 except as illustrated in FIG. 5 the portion corresponding to the outwardly inclined outer wall terminates short of the flange 15. The male end 12 may be slightly smaller than the femal end 11 or the male end may be compressed slightly for reception within such female end. The inturned flanges 29 preferably are not offset relative to each other and consequently there is a resilient connection between such flanges to improve the tightness of the joint.

As illustrated in FIGS. 6, 7 and 8, the length of gutter 10 is adapted to have one or more arcuate portions 30 and a recessed portion 31 on the female end 11 and cooperating arcuate portions 32 and recessed portion 33 on the male end 12. The offset portion 20 is provided with arcuate portions 34 and a recessed portion 35 for cooperative engagement with the arcuate portions 32 and the recess 33 respectively of the male end of the gutter, and the offset portion 22 has arcuate portions 36 and a recessed portion 37 for cooperative engagement with the arcuate portions 34 and recess 35 of the offset portion 20. When the cooperating ends of the gutter are connected, the interfitting arcuate portions and recesses form a lock to prevent the lengths of gutter from becoming disengaged during the installation and use of the gutter.

With reference to FIGS. 9, 10 and 11, the gutter 10 has a female end 11 and a male end 12 and such female end is provided with an offset portion 20 having a flange 21 at one end for connection to the gutter 10 to form a sealant reservoir or pocket in which is received the male end 12 of an adjoining length of gutter. In order to maintain the male and female ends in assembled relation, the female end is provided with a plurality of corrugations 40 in the lower portion of the walls 26 and 28 and the male end 12 is provided with cooperating corrugations 41 which nest with the corrugations 40. If desired, the offset portion 20 also may have corrugations 42 which cooperatively engage the corrugations 41 of the male end 12.

With reference to FIGS. 12 through 15, a modified form of the invention is disclosed including a length of gutter 45 adapted to be joined in end to end relation and such gutter having a female end 46 and a male end 47. The gutter 45 is of generally semi-cylindrical configuration having a rolled edge 48 along the outer lip. The female end 46 is provided with an offset member 49 having a flange 50 at one end for permanently attaching such offset to the gutter 45 in any desired manner as by welding or the like. The offset portion 49 has a rolled sleeve 51 in which the rolled edges 48 are adapted to be received.

In order for the rolled sleeve 51 to accommodate the rolled edge 48 of both the male and female ends of the gutter, the rolled edge 48 of the female end is removed as illustrated in FIG. 15 a distance corresponding to the offset portion of the member 49 to permit the rolled edge 48 of the male end of the gutter to enter the sleeve 51. If desired, the pocket formed between the female end 46 and the offset member 49 may be utilized as a sealant reservoir so that when a pair of gutters are assembled in end to end relation, the joint will exclude water to prevent any leakage.

The female end 46 is provided with a series of recesses or detents 52 which cooperatively engage a series of recesses or detents 53 in the male end 47 of the gutter, and such detents 53 cooperatively engage a series of recesses or detents 54 in the offset member 49. When adjacent ends of the gutter are assembled, the recesses or detents will form a lock and prevent the ready withdrawal or separation of the male and female ends.

With reference to FIGS. 16 and 17, a gutter 60 is provided having a female end 61 and a male end 62 with such male end received within a pocket formed by an offset member 63 similar to the gutter described with reference to FIGS. 9 through 11. In order to form a tight seal between the female and male ends of adjacent gutters, a spring clip 64 is provided which is adapted to straddle the rear edge of the female end 61 and compress the offset member 63 and the female end 61 together. The clip 64 comprises a pair of legs 65 and 66 connected by a bight portion 67 and constructed of resilient material in order to urge the female end of the gutter into intimate contact with the male end. The free end of the leg 66 is provided with an outwardly turned portion 68 to assist in the application of the clip to the gutter.

A second clip 70 is provided for urging the inturned flange portions of the gutters into intimate contact with each other and such clip includes a pair of legs 71 and 72 connected by a bight portion 73. The leg 72 is provided with an outwardly turned portion 74 to assist in the application of the clip to the inturned flange portions of the gutter. It will be noted that the clips 64 and 70 cannot be observed from a position below the upper edge of the gutter and therefore do not detract from the esthetic appearance of such gutter.

FIG. 18 discloses a pair of clips 77 and 78 similar to the clips illustrated in FIGS. 16 and 17 and heretofore described with the exception that such clips are utilized with a semi-cylindrical gutter. The clips 77 and 78 are constructed of resilient material and are adapted to urge the opposed sides of the female end into intimate engagement with the male end to insure a permanent bond.

With reference to FIGS. 19 and 20, an independent coupling member 80 is provided for connecting a pair of gutters 81 having a male end 82 at each end. Each of the male ends has an offset member 83 with a flange 84 for permanently attaching such offset member to the gutter 81 in any desired manner as by welding or the like. In order to form a water-tight joint, the coupling 80 is provided with a central plate or partition 85, an outer plate 86 having a central portion 87 in contact with the central plate 85 and a pair of outwardly extending offset portions 88 spaced from the central plate a distance corresponding to the thickness of the material of the gutter 81.

An inner plate 89 is provided having a central portion 90 in contact with the center plate 85 and a pair of offset outwardly extending portions 91 spaced from the central plate 85 a distance generally corresponding to the thickness of the material of the gutter 81. The plates 85, 86 and 89 are connected into an integral unit by rivets or other fasteners 92 and the pockets created by the offset portions 88 and 91 form reservoirs in which a waterproof sealant may be received. The pockets are adapted to receive the male ends of the adjoining gutters 81 in such a manner that in order for any liquid to escape, it must follow a serpentine path through the several layers of the coupling which has been filled with the sealant.

FIGS. 21 and 22 illustrate structures for containing a relatively large reservoir of waterproof sealant. In FIG. 21 the female end 94 of a gutter 95 is provided with an offset portion 96 having a flange 97 for permanently attaching the offset portion to the female end 94. The offset portion 96 is spaced a substantial distance from the female end 94 of the gutter 95 and is provided with a forwardly extending portion 98 spaced a lesser distance from such gutter to provide a relatively large reservoir for the sealant material. The cooperating male end 100 of the gutter 95 is provided with an offset portion 101 having a flange 102 for permanently attaching such offset portion to the male end 100 of the gutter, and such offset portion 101 is provided with a downwardly curved arcuate portion 103 for engagement with the offset portion 96 of the female end 94. When the contiguous ends of the gutter are thus assembled, water is substantially excluded from the joint and any water or other liquid which seeps into the opening of the joint is prevented from passage therethrough by the sealant within the reservoirs.

FIG. 22 illustrates a further modification of the invention in which a pair of large sealant reservoirs are substantially filled with a waterproof sealant. The female end 106 of the gutter terminates in an arcuate portion 107, an inclined upwardly projecting portion 108, a reverse portion 109 generally parallel to the female end of the gutter 106 and a relatively short downwardly inclined portion 110 generally parallel to the inclined portion 108. As illustrated in FIG. 22 this structure forms a pocket or reservoir for a sealant 111. The male end 112 of the gutter terminates in an arcuate or bight portion 113 and a reversely bent portion 114 disposed at a slight angle to the male end 112. Additional sealant 115 is disposed within the bight portion of the male end and when the ends of the gutter are assembled, the portion 114 of the male end 112 is received within the reservoir of the female end to form a mechanical lock to prevent the ends from spreading or tending to separate under stress and the sealant contained within the reservoirs provides a water-tight connection in which water is excluded from the joint.

With reference to FIGS. 23 and 24, a further modified form of the invention is disclosed including a length of gutter 120 having a female end 121 and a cooperating male end 122. The gutter 120 is provided with a pair of inwardly struck ridges 123 and 124 adjacent to the free end of each side of the gutter. The ridges 123 and 124 extend the full length of the gutter and the ridges of the male end 122 are adapted to snap over the ridges of the female end to maintain the contiguous ends of two adjacent lengths of gutter in assembled relation. If desired, a coating of low heat metallic sealant such as solder 125 or the like may be bonded to the inside of the female end 121 and the male end may have a coating of similar material 126 on the exterior thereof. When the cooperating ends of the gutter have been assembled, the joint may have heat applied thereto as by a blow torch to cause the sealant of the female end to fuse with the sealant of the male end and form a water-tight connection.

FIGS. 25 and 26 illustrate a further modified form of the invention and includes a length of gutter 130 similar in configuration to the gutter illustrated in FIGS. 1 through 11 and such length of gutter has a female end 131 and a male end 132. The gutter 130 has an upright rear wall 133, a substantially horizontal bottom 134, an outwardly inclined corrugated outer wall 135, and an inturned flange 136. In order to maintain the cooperating ends in assembled relation a ridge 137 is instruck from the rear wall 133 adjacent to the bottom thereof and a similar ridge 138 is instruck from the outer wall 135 adjacent to the bottom thereof. The female end 131 is preferably coated on the inside with a low heat sealant such as solder 139 and the male end 132 is coated with a low heat sealant 140 so that when a pair of contiguous ends are in assembled relation the ridges 137 and 138 will maintain such ends in fixed position until a source of heating can be applied to the joint to cause the sealant of one end to fuse with the sealant of the cooperating end to form a water-tight joint.

FIGS. 27 and 28 illustrate a modification of the invention similar to FIGS. 1 through 11 in which a length of gutter 10 has a female end 11 and a male end 12. The female end has an offset member 20 with a flange 21 on one end thereof permanently attached to such female end and the male end 12 has an offset member 22 with a flange 23 on one end for permanently attaching the offset member 22 to the male end of the gutter. In order to provide a permanent joint between a pair of assembled female and male ends, the inside of the end portion of the female end is adapted to be coated or tinned with a low heat metallic sealant such as solder 144 and both sides of the offset member 20 is likewise coated with the same type of sealant. The end portion of the male end 12 is coated on both sides with a low heat metallic sealant 145 and one side of the offset member 22 is coated with a similar sealant. When the female end and a contiguous male end are in assembled relation, heat is applied to the exterior of the female end until such time as the sealant 144 and the sealant 145 become semi-plastic and fuse together to form a permanent water-tight joint.

It will be apparent from the foregoing that a completely water-tight joint will be provided in a pair of contiguous end portions of a gutter and that such ends may be locked together to prevent their separation during the installation and use thereof. Also it will be apparent that a gutter is provided which can be manufactured in sections and to which a metallic or non-metallic sealant such as non-drying mastic or solder can be applied at the manufacturing plant so that when the gutter is assembled at the building site, no additional sealant will be required to make the joints completely water-proof or to maintain the unit in assembled relation during the installation and use thereof.

Although the present invention has been described and illustrated as applied to the horizontal portion of a gutter, it will be noted that the same structure may be utilized in the elbows and downspouts associated with a gutter to make such joints equally water-tight and to confine the water to the drainage system for the building.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. A gutter unit comprising at least two lengths of substantially U-shaped gutter open at the top and connected in end-to-end relation, each length of gutter having a male end at one extremity and a female end at the opposite extremity, said female end having an offset member attached to the interior thereof and extending substantially around said U-shaped gutter, said offset member being spaced from said female end a distance slightly greater than the thickness of the gutter material, said female end and said offset member providing a reservoir, a waterproof non-hardening mastic within said reservoir, the male end of a contiguous length of gutter being received within said reservoir, said female end and said offset member having a plurality of longitudinally spaced detents, said male end having a plurality of cooperating longitudinally spaced detents, and the offset detents of said male end being received within the offset detents of said female end and locking the lengths of gutter in assembled relation, whereby a waterproof joint is provided between adjacent lengths of gutter to prevent leakage of water through said joint and to maintain said lengths of gutter in assembled relation.

2. A gutter unit for application to a building comprising at least two lengths of gutter connectable in end-to-end relation, each length of gutter having a male end at one extremity and a female end at the opposite extremity, at least said female extremity having an offset member fixed to the interior thereof, said offset member being fixed to said length of gutter in spaced relation to said female end and providing a reservoir, a waterproof non-hardening mastic within said reservoir, said member being offset from said female end a distance slightly greater than the thickness of said male end, the male end of a contiguous length of gutter received within said reservoir, means locking said received male end to said female end, said locking means including cooperating arcuate portions and recessed portions in said male and female ends for locking adjacent lengths of gutter in assembled relation, whereby a waterproof joint is provided between adjacent lengths of gutter to prevent leakage of water through said joint.

3. A length of gutter for application to a building comprising an elongated body having a male portion at one end and a female portion at the other end, a first offset member fixed to the interior of said male portion with the terminal portion thereof being generally parallel with said male portion and spaced therefrom a distance slightly greater than the thickness of material of the gutter and forming a reservoir for a non-hardening mastic, a second offset member fixed to the interior of said female portion with the terminal portion thereof being generally parallel with said female portion and spaced therefrom a distance slightly greater than the thickness of material of the gutter and forming a reservoir for a non-hardening mastic, a laterally extending detent on at least one of said male and female portions and the respective terminal portion thereof, a recess conforming to said detent on the other of said male and female portions and the respective terminal portion thereof for locking cooperattion with the male or female portion of an adjoining length of similarly formed gutter, whereby the male portion of said gutter is receivable within the female portion of a contiguous length of gutter and said female portion can receive the male portion of another contiguous length of gutter in a manner that the lengths of gutter will be locked in assembled relation.

References Cited by the Examiner
UNITED STATES PATENTS

| | | | |
|---|---|---|---|
| 460,982 | 10/1891 | Moore | 61—15 |
| 761,643 | 6/1904 | Backman | 285—331 |
| 1,951,122 | 3/1934 | Balze | 285—331 |
| 1,979,470 | 11/1934 | Johnson | 285—291 X |
| 2,639,680 | 5/1953 | Tennison | 61—15 |
| 2,647,476 | 8/1953 | Gibbons | 61—15 |
| 2,650,114 | 8/1953 | Epstein | 285—304 |

FOREIGN PATENTS

| | | |
|---|---|---|
| 21,050 | 9/1909 | Great Britain. |

EARL J. WITMER, *Primary Examiner.*

JACOB L. NACKENOFF, *Examiner.*

D. R. COMUZZIE, *Assistant Examiner.*